United States Patent
Hull

(10) Patent No.: US 10,084,366 B2
(45) Date of Patent: Sep. 25, 2018

(54) APPARATUS AND METHOD FOR IN-SITU CHARGING OF SUPERCONDUCTORS

(71) Applicant: The Boeing Company, Huntington Beach, CA (US)

(72) Inventor: John R. Hull, Sammamish, WA (US)

(73) Assignee: THE BOEING COMPANY, Chicago, IL (US)

( * ) Notice: Subject to any disclaimer, the term of this patent is extended or adjusted under 35 U.S.C. 154(b) by 295 days.

(21) Appl. No.: 14/630,776

(22) Filed: Feb. 25, 2015

(65) Prior Publication Data
US 2016/0380526 A1    Dec. 29, 2016

(51) Int. Cl.
*H02K 1/00* (2006.01)
*H02K 55/00* (2006.01)
*H02K 55/04* (2006.01)

(52) U.S. Cl.
CPC ............. *H02K 55/00* (2013.01); *H02K 55/04* (2013.01); *Y02E 40/62* (2013.01); *Y02E 40/625* (2013.01)

(58) Field of Classification Search
CPC ................................ H02K 55/00; H02K 55/04
USPC ........................................................ 310/179
See application file for complete search history.

(56) References Cited

U.S. PATENT DOCUMENTS

| | | | |
|---|---|---|---|
| 3,602,854 A * | 8/1971 | Kawabe | H01F 6/005 335/216 |
| 7,889,035 B2 | 2/2011 | Hull et al. | |
| 8,008,826 B2 | 8/2011 | Hull et al. | |
| 2001/0013818 A1 * | 8/2001 | Young | F17C 3/085 335/216 |
| 2013/0002075 A1 * | 1/2013 | Edwards | H02K 49/06 310/103 |

FOREIGN PATENT DOCUMENTS

JP    08256486 A  * 10/1996

OTHER PUBLICATIONS

Durrell et al., "A trapped field of 17.6T in melt-processed, bulk Gd—Ba—Cu—O reinforced with shrink-fit steel," Superconductor Science and Technology 27, 2014, 5 pages.

* cited by examiner

*Primary Examiner* — Jianchun Qin
(74) *Attorney, Agent, or Firm* — MH2 Technology Law Group LLP

(57) ABSTRACT

An apparatus and method for charging a superconductor, such as a high temperature superconductor (HTS), in-situ, including a superconductor that is magnetized by a magnet. A surface area of the magnet is smaller than a surface area of the superconductor and the magnet scans the surface area of the superconductor to magnetize the superconductor one portion at a time. An additional compression superconductor may be used to compress the magnetic flux from the magnet such that the magnetic flux exits the compression superconductor via an aperture on the surface of the compression superconductor and then impinges the surface of the superconductor being charged. The superconductor is assembled in a machine prior to being magnetized and may be cooled prior to magnetization.

17 Claims, 6 Drawing Sheets

US 10,084,366 B2

APPARATUS AND METHOD FOR IN-SITU CHARGING OF SUPERCONDUCTORS

TECHNOLOGICAL FIELD

The present disclosure relates generally to high temperature superconductors and, in particular, to an apparatus and method for trapping magnetic flux in superconductors in-situ in machines such as electrical generators and motors.

BACKGROUND

It is well known in the art that superconductors, such as high-temperature superconductors ("HTSs"), act as powerful analogs to permanent magnets, and electrical machines made with HTSs have many features of brushless motors and generators that use permanent magnets. It is further known in the art that magnetic flux that is trapped in HTSs may be used to achieve unprecedentedly high specific power levels in electrical motors and generators as opposed to permanent magnets. As a point of comparison, the magnetization of the best permanent magnets is about 1 to 1.5 T. On the other hand, trapped magnetic flux in HTSs has been shown to have a world record magnetization of about 17.6 T, which is over an order of magnitude higher than permanent magnets.

One of the significant challenges with use of HTSs pertains to how to effectively charge the HTSs in-situ. Prior art attempts to magnetize HTSs in-situ have resulted in trapped magnetic fields that were not much larger than what can be achieved with the use of permanent magnets. Thus, in order to achieve the world record trapped magnetic field as described above using prior art methods, an HI'S was charged by a very large superconducting magnet and the HTS was contained in an isolated laboratory environment rather than in a machine. Also, in order to obtain the world record magnetization using prior art methods, the external magnetic field was applied to the I-ITS and then it was field cooled (FC). This method is contrary to the in-situ charging method described below with respect to the present disclosure, which typically involves zero-field cooling (ZFC), wherein the HTS is first cooled and then a magnetic field is applied. Typically, to obtain the same amount of trapped flux, the ZFC procedure requires twice the applied magnetic field than does a FC procedure.

After magnetizing the HTS with a large superconducting magnet in a laboratory environment according to the prior art method just described, the bulk HTS is then assembled in a machine. However, this entire assembly process has to be done cold, meaning that the assembly has to be conducted in a cold room, and very likely in a vacuum environment as most gases would condense at the cryogenic temperature required. In addition, this prior art method requires the use of strong robotic manipulators to complete the machine assembly because of the large magnetic forces associated with energized magnets. The assembled machine is then removed from the cold room and the outer enclosure of the machine is allowed to warm to ambient temperature, but the HTSs have to remain at cryogenic temperatures in order to not lose their magnetization. While such prior art method of assembly is feasible, the paradigm of keeping a motor or generator cold over its operating life has not been adopted by industry consumers of high specific-power machines. Rather, consumers would prefer to magnetize HTSs in-situ, so that the machine can be assembled with the HTSs unmagnetized and at ambient temperature.

A further drawback of the prior art methods for putting trapped magnetic flux in HTSs is that the diameter of the magnet needed to produce the required field is bigger than the diameter of the HTS, particularly because the magnetizing flux enters the HTS from its outer perimeter surface. From an in-situ standpoint, this is a significant disadvantage because such a large power supply is needed to energize the magnet.

It is, therefore, desirable, to have an apparatus and method for efficiently charging bulk HTSs in-situ.

BRIEF SUMMARY

In view of the foregoing background, example implementations of the present disclosure provide an apparatus for charging a first superconductor in-situ in a machine including the first superconductor and a magnet that magnetizes the first superconductor. When the magnet is energized, magnetic flux exits the magnet and impinges a surface of the first superconductor such that at least some of the magnetic flux enters and becomes trapped in the first superconductor to magnetize the first superconductor. The magnet scans a surface area of the first superconductor such that the magnetic flux exiting the magnet impinges the surface of the first superconductor one portion at a time. The surface area of the magnet is smaller than the surface area of the first superconductor.

In some examples, the magnet is a permanent magnet. In other examples, the apparatus further includes a second superconductor that compresses the magnetic flux generated by the magnet. The second superconductor includes a frustum hole extending through the second superconductor and a first aperture on a surface of the second superconductor. The first aperture is contiguous with the frustum hole such that the magnetic flux is compressed in the frustum hole of the second superconductor and exits the second superconductor via the first aperture on a surface of the first superconductor. In some examples, the diameter of the first aperture is less than a diameter of the first superconductor. In other examples, the second superconductor includes at least one additional aperture on the surface of the second superconductor that is also contiguous with the frustum hole. The first aperture and the at least one additional aperture may have the same diameter or differing diameters.

In example implementations of the present disclosure, the magnet is moved to scan the surface area of the first superconductor in a predefined pattern selected from the group consisting of traversing and rotating. In other examples, the first superconductor is scanned by the magnet as the first superconductor is moved.

In some examples, the first superconductor is magnetized by the magnet after the first superconductor is assembled within the machine. In other examples, the first superconductor is cooled prior to being magnetized.

The present disclosure further contemplates a method of charging a first superconductor in-situ in a machine including the steps of energizing a magnetizer including a magnet and magnetizing the first superconductor by the magnetizer scanning a surface area of a first superconductor one portion at a time such that magnetic flux exits the magnetizer, impinges a surface of the first superconductor, and enters the first superconductor. The surface area of the magnetizer may be smaller than the surface area of the first superconductor.

In some examples, the magnetizer includes a permanent magnet. In other examples, the magnetizer includes a second superconductor that compresses the magnetic flux that is impinged on the surface of the first superconductor.

In one example, the magnetizing step includes the step of moving the magnetizer to scan the surface area of the first superconductor in a predefined pattern of traversing and/or rotating. In another example, the magnetizing step includes the step of moving the first superconductor such that the surface area of the first superconductor is scanned by the magnetizer.

One example of the present disclosure further includes the step of assembling the first superconductor in the machine prior to magnetizing the first superconductor. In another example, the first superconductor is cooled after the assembling step and prior to the magnetizing step.

The features, functions and advantages discussed herein may be achieved independently in various example implementations or may be combined in yet other example implementations, further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
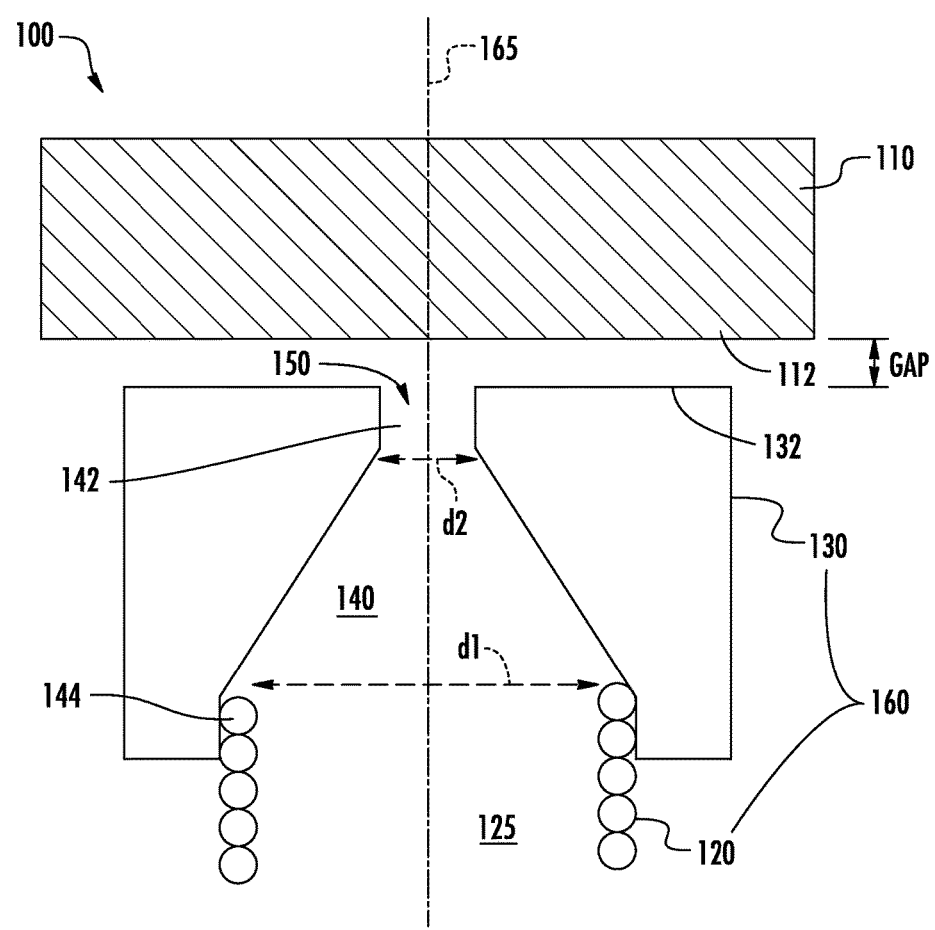
FIG. 1 is a cross-sectional view of a magnetization apparatus according to one aspect of the disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure relate generally to in-situ magnetization of a superconductor, such as an HTS, with a magnetizing coil that is smaller than the surface area of the superconductor being magnetized and at magnetic field strengths much higher than prior art in-situ magnetization methods. Example implementations of the present disclosure also relate to a process of magnetizing a superconductor one portion at a time such that the power supply required to energize the magnetizing coil is less than that needed for prior art magnetization methods. Additionally, the magnetizing process used in example implementations of the present disclosure uses flux compression to amplify the magnetic fields produced by the magnetizing coil, which further reduces the power supply required for magnetization of the superconductor.

Referring now to FIG. 1, a cross-sectional view of an apparatus 100 for magnetizing an HTS 110 is shown in accordance with one implementation of the present disclosure. The magnetization apparatus 100 includes a device HTS 110, a solenoid coil 120, and a compression HTS 130. Together, the coil 120 and the compression HTS 130 form a moving magnetizer 160, which has a surface area that is smaller than the surface area of the HTS 110. In an example implementation, there is a small gap between adjacent surfaces of the device HTS 110 and the compression HTS 130, i.e., between the surface 112 of the device HTS 110 and the surface 132 of the compression HTS 130. In this example, the compression HTS 130 includes a frustum hole 140, as well as a small diameter cylindrical hole 142 residing above frustum hole 140 and a larger diameter cylindrical hole 144 residing below frustum hole 140. At least part of coil 120 fits inside the larger diameter hole 144, where the coil 120 is attached to the compression HTS 130. The coil 120 has an inner diameter d1, which is larger than the diameter d2 of the small hole 142. The small hole 142 creates an aperture 150 on the surface of the compression HTS 130.

When the coil 120 is energized, magnetic flux appears in the interior of the coil 125 and exits the coil envelope at the top into the frustum hole 140 through the area defined by diameter d1. The magnetic flux generated by coil 120 is compressed in frustum hole 140 and exits the compression HTS 130 through aperture 150. The ratio of the magnetic field at aperture 150 to the magnetic field in the coil interior 125 is defined by the square of the ratio (d1/d2). The magnetic flux emerging from the aperture 150 impinges the surface 112 of the device HTS 110 and the magnetic flux enters device HTS 110 in the vicinity of aperture 150. A portion of this entering magnetic flux becomes trapped in the device HTS 110.

In order to magnetize the entire HTS 110 in this example implementation, the moving magnetizer 160 is scanned over the surface 112 of the device HITS 110 such that aperture 150 covers the complete surface 112 area of the device HTS 110 during the scan. Thus, in example implementations, the moving magnetizer 160 is attached to a device that traverses the movable magnetizer 160 in at least two directions perpendicular to centerline 165 of the apparatus 100. In example implementations, the moving magnetizer 160 is moved in directions both parallel and perpendicular to the centerline 165 of the apparatus 100 for efficient scanning of the surface 112 of the device HTS 110.

Similar to the compression HTS 130, the device HTS 110 reacts diamagnetically to a change in magnetic flux over its surface 132, such as the flux emerging from the aperture 150 in the compression HTS 130. By way of explanation of how the magnetic flux gets trapped in the device HTS 110, when a magnetic field is applied to the surface 112 of the device HTS 110, the field at the surface 112 is that of the applied field, and to a first approximation the field falls to zero with a fixed gradient over a distance x, where x=H/Jc. H is the applied field and Jc is the critical current density. In the compression HTS 130, some of the flux exists in an annular region near the aperture 150 on surface 132, and makes d2 effectively bigger by a small amount. When the applied field is removed, some of the flux in this gradient region remains. A similar effect occurs in the device ITS 110, where the applied field penetrates surface 112 by an amount that depends on the Jc of the device HTS 110.

In one example implementation, in order to maximize the flux compression, the Jc of compression HITS 130 is as large as possible. This may be achieved by compression HTS 130 having a low temperature (e.g., being cooled to a superconducting state before any magnetic flux is applied), because Jc increases with decreasing temperature. In another embodiment, the Jc of the device HTS 110 is lower than the maximum but still high enough to result in full penetration of the trapped magnetic flux throughout the volume of the device HTS 110. This is accomplished by controlling the amount and type of flux-pinning centers in the device HTS 110. Alternatively, during the flux-trapping process, the temperature of the device HTS 110 may be higher than its operating temperature or higher than the temperature of compression HTS 130 to ensure penetration of the magnetic flux in device HITS 110.

In example implementations of the present disclosure, the coil 120 is a superconducting coil or a pulsed coil. If the coil 120 is superconducting, it can be left energized for long periods while the scanning of the device HTS 110 is performed by the moving magnetizer 160. If the coil 120 is pulsed, the scanning performed by the moving magnetizer 160 is coordinated with the timing of the pulses so that the surface 112 of the device HTS 110 is completely scanned in an efficient manner. Pulsed coils generally produce larger magnetic fields than superconducting coils; however, pulsed coils have the disadvantage that they must usually be cooled between pulses. With either coil 120 type, it is desirable to keep the coil 120 at a cryogenic temperature. In example implementations, the temperature of the superconducting coil is kept below the superconducting transition temperature and the temperature of the pulsed coil is lowered to reduce resistivity of the coil wires. In both examples, the cooler coil 120 results in higher current flow and, thereby, generates higher magnetic fields.

In an alternative implementation of the present disclosure, a permanent magnet is used to magnetize the device HTS 110, in which implementation the compression HTS 130 is cooled to its operating temperature while the permanent magnet is not in position. The permanent magnet is then moved into the position where the coil 120 is shown in FIG. 1, even with a force acting against the movement of the permanent magnet. Once the permanent magnet is in place, the magnetization of the device HTS 110 proceeds as described above by the permanent magnet scanning the surface area of the device HTS 110.

Figure 2:
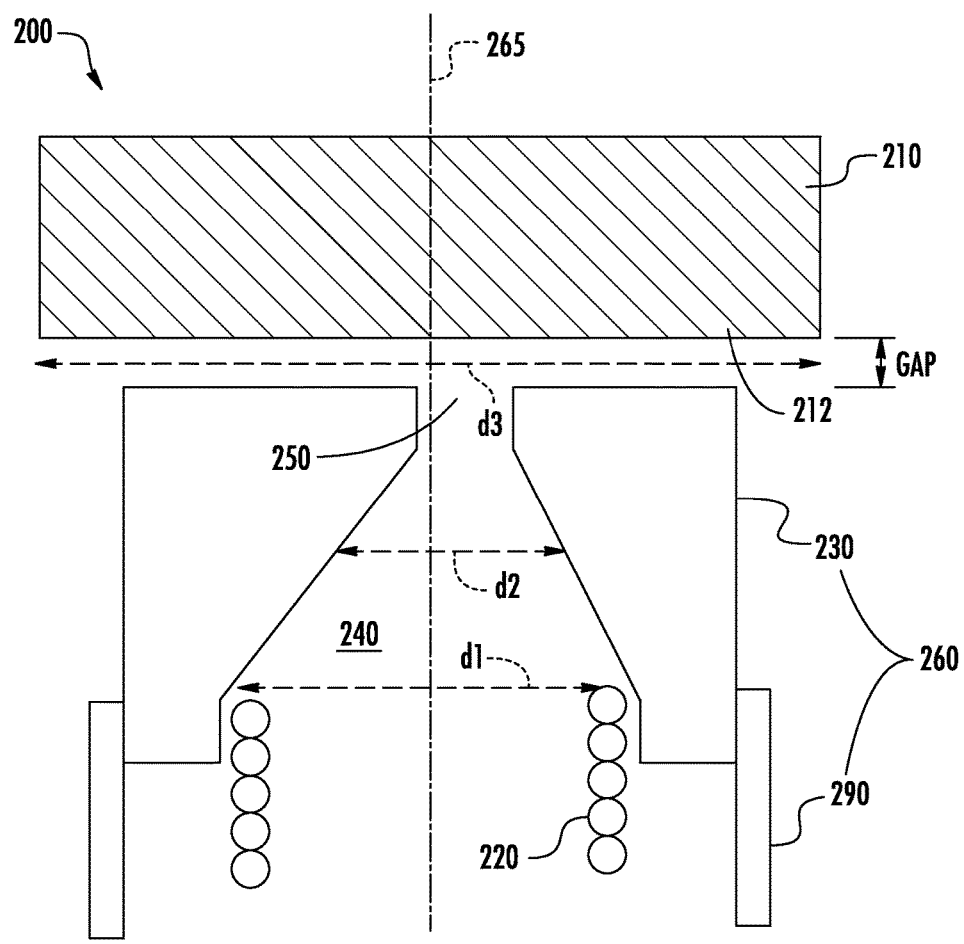
FIG. 2 is a cross-sectional view of a magnetization apparatus according to another aspect of the disclosure.

Referring now to FIG. 2, a cross-sectional view of an alternative embodiment for magnetizing a device HTS 210 is shown. In this example, the magnetization apparatus 200 includes a device HTS 210, solenoid coil 220, compression HTS 230, and rotatable member 290. Together, the compression HTS 230 and the rotatable member 290 comprise a movable magnetizer 260, which has a surface area that is smaller than the surface area of the HTS 210. The movable magnetizer 260 rotates about centerline 265 while, in this example implementation, the coil 220 remains stationary. Unlike the example depicted in FIG. 1, in the example depicted in FIG. 2 the aperture 250 is offset from the centerline 265. Thus, when the movable magnetizer 260 rotates, aperture 250 scans an area of the surface 212 of device HTS 210 that has a diameter d3 and impinges trapped magnetic flux into this region of device HTS 210. In yet a further embodiment of the present disclosure, the movable magnetizer 260 both rotates and traverses the surface of the device HTS 210 as part of the scanning procedure. It is noted that in addition to the energy required to magnetize the coil 220, energy is also required in this example for powering the motor that rotates magnetizer 260 against the magnetic forces opposing this motion.

Figure 3:
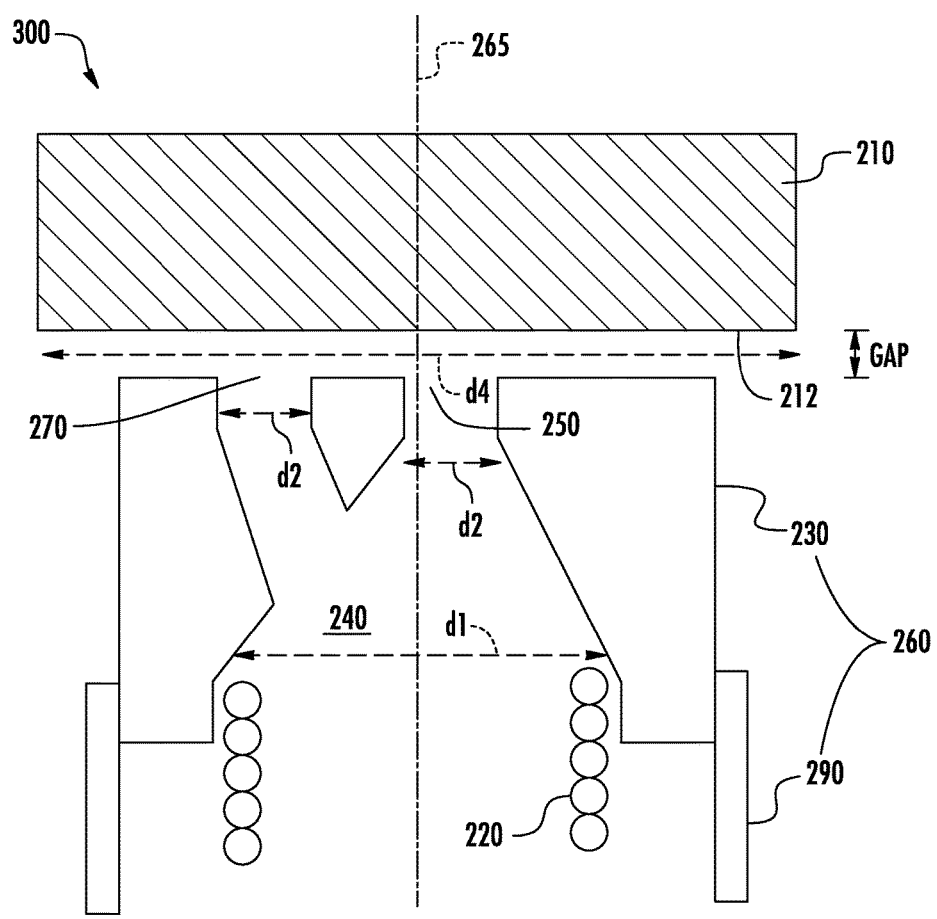
FIG. 3 is a cross-sectional view of a magnetization apparatus according to yet another aspect of the disclosure.

Referring now to FIG. 3, a cross-sectional view of yet a further example implementation for magnetizing a device HTS 210 is shown as magnetization apparatus 300, which is a slight modification of the example depicted in FIG. 2. In this example, a larger portion of the of device HTS 210 is magnetized due to the addition of a second passage for the frustum hole 240 of compression HTS 230. A second aperture 270 is the exit of this second passage, which also has a diameter d2 (the same diameter d2 of the first passage). The location of aperture 270 is such that the annular area that it scans is just outside the area that aperture 250 scans. Together, apertures 250 and 270 scan over a surface 212 area on HTS 210 that has a diameter d4.

In one modification to the example shown in FIG. 3, instead of the apertures 250 and 270 having the same diameter d2, the apertures 250 and 270 apertures have differing diameters. In yet another example, the entire surface 212 of the device HTS 210 is scanned when the outer diameter of the compression HTS 230 is larger than the diameter of the device HTS 210. In this example, the diameters of the apertures 250, 270 are larger such that d2 is half the diameter of device HTS 210. Also in this example, the flux compression is a factor of 2 such that the magnetic field impinging the surface 212 of the device HTS is twice that in the center of the coil 220. In yet a further example implementation, additional apertures are provided that are progressively farther from centerline 265. For example, if there are four apertures, each with a diameter of the diameter of the device HTS 210, the factor of compression is 4. In this example, the area of each aperture comprises $\frac{1}{16}^{th}$ the area of surface 212.

Figure 4:
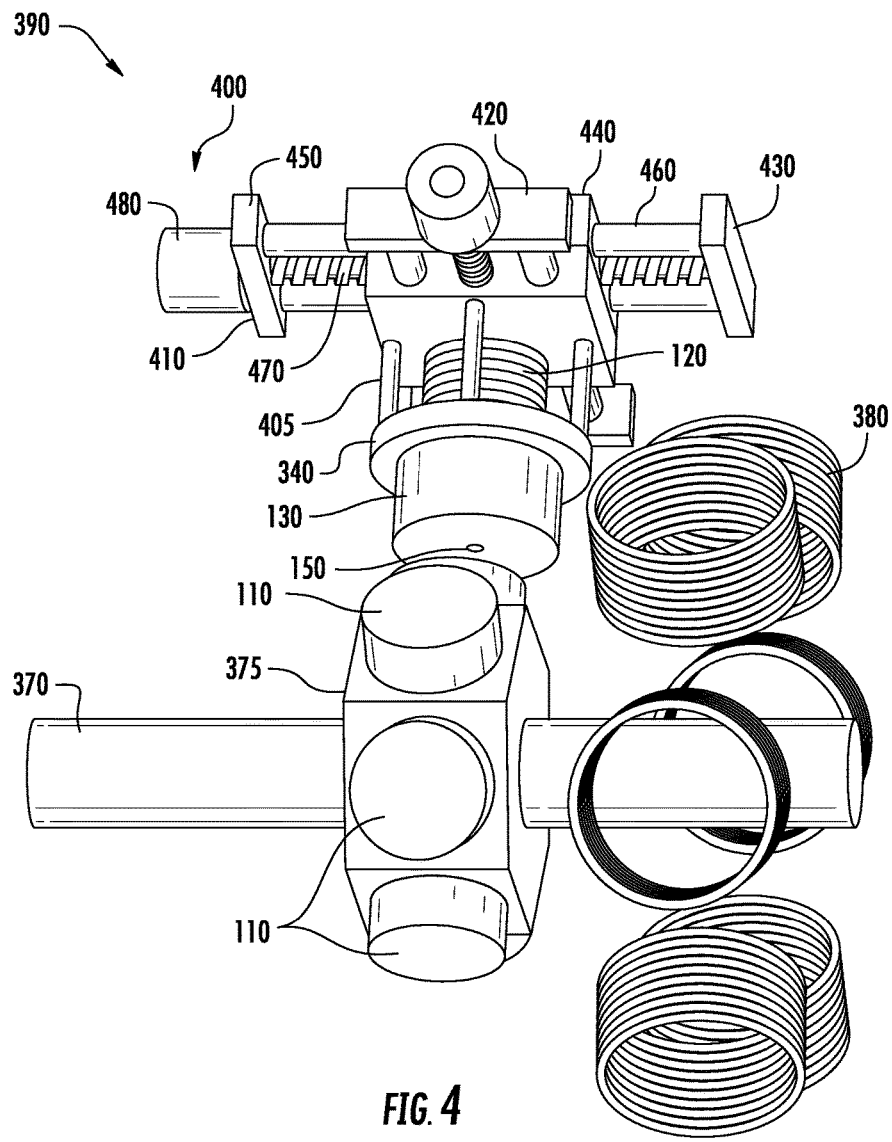
FIG. 4 is a perspective view of a part for a motor or generator including a magnetization apparatus according to the aspect depicted in FIG. 1.

Referring now to FIG. 4, an exemplary part of a machine, such as an electrical motor or generator, is depicted as a 6-pole machine 390 wherein a device HTS in charged in-situ in accordance with one implementation of the present disclosure. In this example, which corresponds with the magnetization apparatus of FIG. 1, the machine 390 includes a hexagonal mounting fixture 375 that is rigidly attached to a shaft 370. A device HTS 110 is mounted on each of the six outward faces of the mounting fixture 375. In this example, there are six device HTSs 110, but only one compression HTS 130. Stator coils 380 are spaced radially outward from the circular array of the device HTSs 110. This allows the stator coils 380 to have a ferromagnetic core in their interior to enhance the magnetic flux passing through them. To begin the in-situ charging procedure, shaft 370 is rotated about its central axis until the alignment shown in FIG. 4 is achieved, i.e., with one of the device HTSs 110 directly under compression HTS 130. The shaft 370 is then prevented from rotating. The device HTS 110 can be cooled either before or immediately after this operation. Next, the coil 120 is energized and the compression HTS 130 is scanned over the device HTS 110 by a translating stage apparatus 400.

The compression HTS 130 has a containment ring 340 that connects to the translating stage apparatus 400 by mechanical connectors 405. In this example, the translating stage apparatus 400 includes a first translating stage 410, which moves the compression HTS 130 in the direction of the axis of the shaft 370 of the machine 390. Stage 410 is connected to a second translating stage 420 that moves the compression HTS 130 transverse to the axis of shaft 370. This bidirectional scanning performed by the compression HTS 130 results in magnetization of the device HTSs 110 as described above with respect to FIG. 1.

In example implementations of the present disclosure, any prior art translating stage apparatus will generally suffice to bi-directionally move the compression HTS 130 to scan the device HTSs. However, in the example depicted in FIG. 4, the first translating stage 410 includes end plate 430, central plate 440, front plate 450, glide rods 460, motor screw rod 470, and motor 480. The glide rods 460 are fixed between end plate 430 and front plate 450. Glide rods 460 pass through holes in the central plate 440 that are oriented in the direction of travel of the central plate 440. In example implementations, the central plate 440 is free to move along glide rods 460. The screw threads of motor rod 470 engage with corresponding screw threads in the central hole of central plate 440.

Also in the translating stage apparatus 400 depicted in FIG. 4, the front end of motor rod 470, passes through front plate 450 and is attached to the shaft of electrical motor 480. The electrical motor 480 turns the motor rod 470 clockwise or counter clockwise, which in turn moves the central plate 440 forward or backward along the direction of travel. End plate 430 and front plate 450 of the uppermost translating stage are rigidly connected to the frame of the machine 390.

As an alternative to using a translation stage apparatus 400, the shaft 370 can be adapted to axially translate such that the compression ITS 130 is stationary and scans the surface area of the device HTS 110 as the device HIS 110 is moved with the shaft 370.

After the compression HTS 130 scans and magnetizes the device HTS 110 by means of the translation stage apparatus 400 or axially moving shaft 370, the shaft 370 is again rotated 60 degrees about its central axis and then prevented from rotating. This moves a new device HTS 110 into alignment with compression HTS 130 and the charging process is repeated. This rotation and charging sequence is repeated until all device HTSs 110 are fully charged with trapped magnetic flux. At this point, coil 120 is de-energized, and compression HTS 130 and coil 120 (if superconducting) are able to warm up above their superconducting transition temperatures. In this state, coil 120 and compression HTS 130 do not interfere with the operation of the machine 390.

Figure 5:
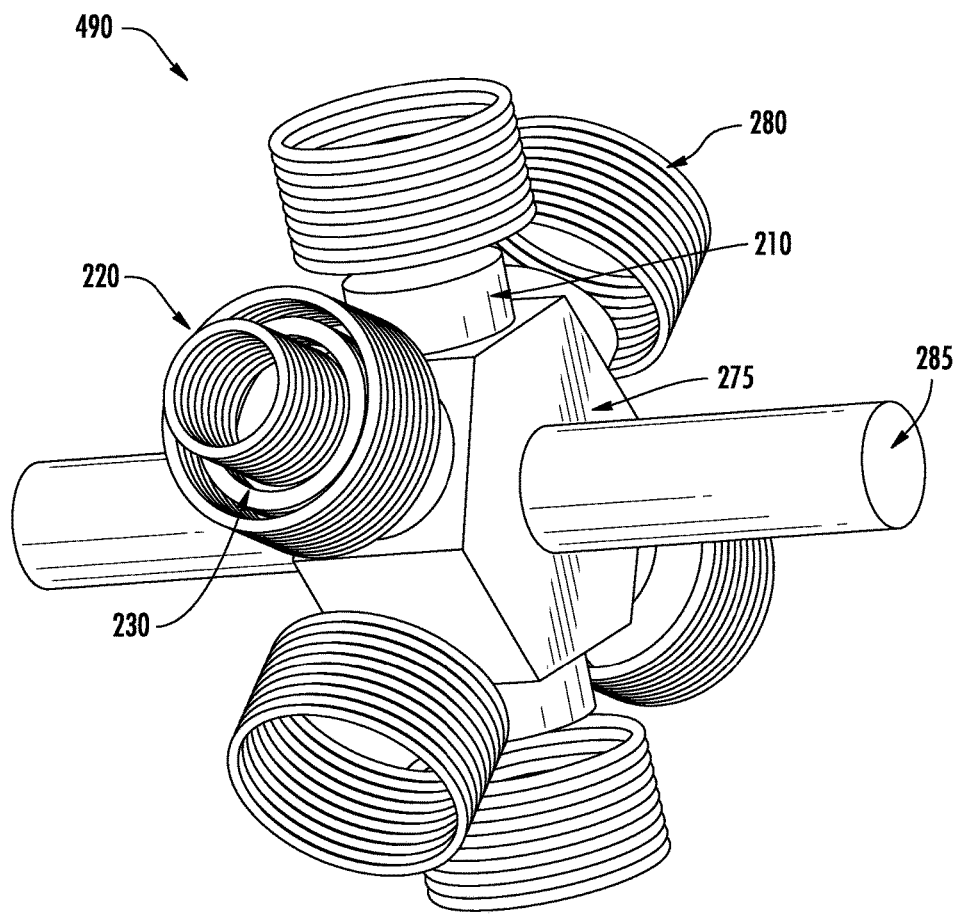
FIG. 5 is a perspective view of a part for a motor or generator including a magnetization apparatus according to the aspect depicted in FIGS. 2 and 3.

Referring now to FIG. 5, an alternative example of a machine 490 is depicted as a 6-pole machine wherein the device HTSs 210 are charged in-situ in accordance with an implementation of the present disclosure. In this example, which corresponds with the magnetization apparatus 200 of FIGS. 2 and 3, the machine 490 includes a hexagonal mounting fixture 275 that is rigidly attached to a shaft 285. A device HIS 210 is mounted on each of the six outward faces of the mounting fixture 275. Stator coils 280 are spaced radially outward from the circular array of the device HTSs 210. Inside one of the stator coils 280 is a rotating member 490, as discussed above with respect to FIGS. 2 and 3; however, for clarity only compression HTS 230 and charging coil 220 are shown. In this example, there are six device HTSs 210, but only one compression HTS 230. To begin the in-situ charging procedure, shaft 285 is rotated about its central axis until the alignment shown in FIG. 5 is achieved, i.e., with one of the device HTSs 210 directly under compression HTS 230. The shaft is then prevented from rotating. The device HTSs 210 can be cooled either before or immediately after this operation. Next, the coil 220 is energized and compression HTS 230 is rotated by the rotatable member 490 to scan the surface 212 of the device HITS 210 until the device HTS 210 is completely charged with trapped flux, as discussed above with respect to FIGS. 2 and 3. Next, shaft 285 is again rotated 60 degrees about its central axis and is then prevented from rotating. This moves a new device HTS 210 into alignment with compression HTS 230 and the charging process is repeated. This rotation and charging sequence is repeated until all device HTSs 210 are fully charged with trapped magnetic flux. At this point, coil 220 is de-energized, and compression HTS 230 and coil 220 (if superconducting) are able to warm up above their superconducting transition temperatures. In this state, coil 220 and compression HTS 230 do not interfere with the operation of the machine 490.

Figure 6:
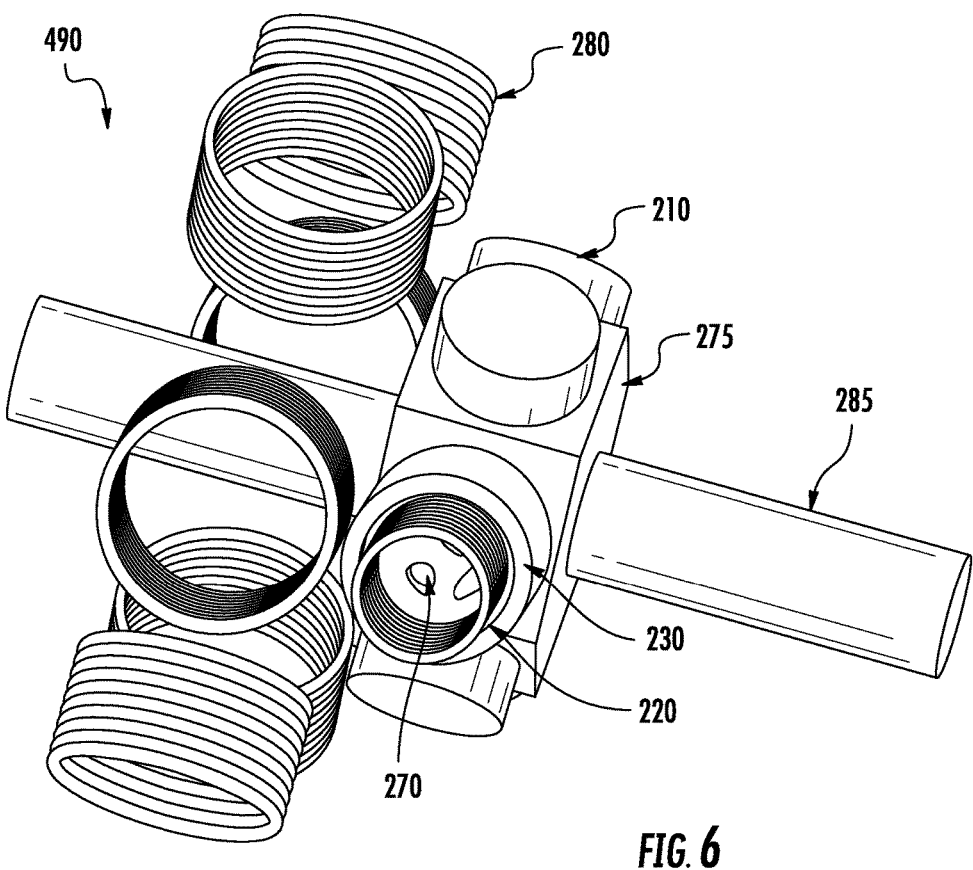
FIG. 6 is a perspective view of a yet an additional part for a motor or generator including a magnetization apparatus also according to the aspect depicted in FIGS. 2 and 3.

Referring now to the alternative example for in-situ charging HTSs as shown in FIG. 6, the charging part of the system is located axially down the shaft 285 from the stator coil 280 assembly. Similar to FIG. 4, the device HTSs 210 are charged by first moving the shaft 285 along its central axis until one of the device HTSs 210 is aligned with compression HTS 230. However, in this embodiment, the set of device HTSs 210 are then charged as described above with respect to FIG. 5. Specifically, the coil 220 is energized and compression HTS 230 is rotated by the rotatable member 490 to scan the surface 212 of the device HTS 210 until the device HTS 210 is completely charged with trapped flux, as discussed above with respect to FIGS. 2 and 3. After the device HTSs 210 have been charged, the shaft 285 is moved back into operating position, with the device HTSs 210 immediately below the stator coils 280.

Yet another alternate example of in-situ charging can be inferred from FIG. 6. In this example, the charging portion of the machine 490 (coil 220, compression HTS 230, etc) is hinged near the back of the machine 490 so that it can rotate out of the volume that the associated stator coil 280 sits in. The associated stator coil 280 for this location also rotates out of the volume. For example, the charging part can rotate circumferentially down and the stator coil 280 can rotate circumferentially up. When the device HTSs 210 are being charged, the stator coil 280 is rotated out and the charging part is rotated in. Once the device HTSs 210 are charged with trapped flux, the charging part is rotated out, and the stator coil 280 is rotated in for device operation. This embodiment has the advantage that the shaft does not have to move and the stator coils can have a desired ferromagnetic core.

It should be understood that variations on the general principals of the invention are possible. For example, in the exemplary machine 290/490, the number of poles can be six, as depicted, or any other number. Also, the shape of the device HTSs does not have to be circular and can rather be other shapes such as rectangular. The device HTSs can also be duplicated axially down the shaft. A number of practical aspects have been omitted from the description that should be obvious to a practitioner skilled in the art. These include bearing support for the shaft, mechanical constraints of the components, a general housing for the device that includes thermal insulation, a means to cool and control the temperature of the HTSs, and a means to power and control the various coils.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus (es) and method(s) disclosed herein in any combination, and all of such possibilities are intended to be within the spirit and scope of the present disclosure.

Many modifications and other implementations of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for charging a first superconductor in-situ in a machine comprising:
   the first superconductor;
   a magnet that magnetizes the first superconductor,
   wherein when the magnet is energized, magnetic flux exits the magnet and impinges a surface of the first superconductor such that at least some of the magnetic flux enters and becomes trapped in the first superconductor to magnetize the first superconductor; and
   a second superconductor that compresses the magnetic flux generated by the magnet such that the magnetic flux exits the second superconductor via an aperture on a surface of the second superconductor and then impinges on the surface of the first superconductor,
   wherein the magnet is moved to scan a surface area of the first superconductor in axial and transverse directions relative to center line axis passing through the surface such that the magnetic flux exiting the magnet impinges the surface of the first superconductor one portion at a time.

2. The apparatus of claim 1 wherein a surface area of the magnet is smaller than the surface area of the first superconductor.

3. The apparatus of claim 1 wherein the magnet is a permanent magnet.

4. The apparatus of claim 1 wherein the second superconductor comprises:
   a frustum hole extending through the second superconductor; and
   a first aperture on a surface of the second superconductor;
   wherein the first aperture is contiguous with the frustum hole; and
   wherein the magnetic flux is compressed in the frustum hole of the second superconductor and exits the second superconductor via the first aperture on a surface of the second superconductor.

5. The apparatus of claim 4 wherein a diameter of the first aperture is less than a diameter of the first superconductor.

6. The apparatus of claim 1 wherein the first superconductor is scanned by the magnet as the first superconductor is moved.

7. The apparatus of claim 1 wherein the first superconductor is magnetized by the magnet after the first superconductor is assembled within the machine.

8. The apparatus of claim 1 wherein the first superconductor is cooled prior to being magnetized.

9. An apparatus for charging a first superconductor in-situ in a machine comprising:
   the first superconductor;
   a magnet that magnetizes the first superconductor,
   wherein when the magnet is energized, magnetic flux exits the magnet and impinges a surface of the first superconductor such that at least some of the magnetic flux enters and becomes trapped in the first superconductor to magnetize the first superconductor; and
   a second superconductor that compresses the magnetic flux generated by the magnet, wherein the second superconductor comprises a frustum hole extending through the second superconductor; a first aperture on a surface of the second superconductor; wherein the first aperture is contiguous with the frustum hole; at least one additional aperture on a surface of the second superconductor that is also contiguous with the frustum hole; wherein the magnetic flux is compressed in the frustum hole of the second superconductor and exits the second superconductor via the first aperture on a surface of the second superconductor, and
   wherein the magnet is moved to scan a surface area of the first superconductor in axial and transverse directions relative to center line axis passing through the surface such that the magnetic flux exiting the magnet impinges the surface of the first superconductor one portion at a time.

10. The apparatus of claim 9 wherein the first aperture and the at least one additional aperture have the same diameter.

11. The apparatus of claim 9 wherein the first aperture and the at least one additional aperture have differing diameters.

12. A method of charging a first superconductor in-situ in a machine comprising the steps of:
    energizing a magnetizer comprising a magnet;
    magnetizing the first superconductor by the magnetizer scanning a surface area of a first superconductor in axial and transverse directions relative to center line axis passing through a top surface one portion at a time such that magnetic flux exits the magnetizer, impinges a surface of the first superconductor, and enters the first superconductor; and
    compressing the magnetic flux generated by the magnet by a second superconductor such that the magnetic flux exits the second superconductor via an aperture on a surface of the second superconductor and then impinges on the surface of the first superconductor.

13. The method of claim 12 wherein a surface area of the magnetizer is smaller than the surface area of the first superconductor.

14. The method of claim 12 wherein the magnetizer comprises a permanent magnet.

15. The method of claim 12 wherein the magnetizing step comprises the step of moving the first superconductor such that the surface area of the first superconductor is scanned by the magnetizer.

16. The method of claim 12 further comprising the step of assembling the first superconductor in the machine prior to magnetizing the first superconductor.

17. The method of claim 16 further comprising the step of cooling the first superconductor after the assembling step and prior to the magnetizing step.

* * * * *